(12) United States Patent  
Yamada

(10) Patent No.: US 7,990,346 B2
(45) Date of Patent: Aug. 2, 2011

(54) DISPLAY METHOD AND DISPLAY DEVICE PREVENTING IMAGE BURN-IN BY BLACK DISPLAY INSERTION

(75) Inventor: Tadashi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1069 days.

(21) Appl. No.: 11/380,751

(22) Filed: Apr. 28, 2006

(65) Prior Publication Data

US 2006/0262048 A1 Nov. 23, 2006

(30) Foreign Application Priority Data

May 23, 2005 (JP) ................................ 2005-149098

(51) Int. Cl.
*G09G 3/30* (2006.01)
(52) U.S. Cl. ......................................................... 345/76
(58) Field of Classification Search .................... 345/76, 345/204; 715/210, 867; 348/173
See application file for complete search history.

(56) References Cited

U.S. PATENT DOCUMENTS

| | | | |
|---|---|---|---|
| 5,481,653 A * | 1/1996 | Kashiwagi et al. ............ | 345/418 |
| 5,796,945 A * | 8/1998 | Tarabella ...................... | 709/219 |
| 5,854,618 A * | 12/1998 | Kiwiet et al. ................. | 715/210 |
| 6,466,135 B1 * | 10/2002 | Srivastava et al. .......... | 340/815.4 |
| 7,030,848 B2 * | 4/2006 | Sato et al. ........................ | 345/95 |
| 2002/0030674 A1 * | 3/2002 | Shigeta .......................... | 345/204 |
| 2003/0146888 A1 * | 8/2003 | Yamazaki et al. ............... | 345/82 |
| 2003/0179221 A1 * | 9/2003 | Nitta et al. ..................... | 345/690 |
| 2003/0227428 A1 * | 12/2003 | Nose ............................... | 345/90 |
| 2003/0231257 A1 | 12/2003 | Ochiai et al. | |
| 2004/0196373 A1 * | 10/2004 | Okano ........................... | 348/173 |
| 2004/0257354 A1 * | 12/2004 | Naugler et al. ............... | 345/204 |
| 2005/0012686 A1 * | 1/2005 | Osame et al. ................... | 345/39 |
| 2005/0093850 A1 * | 5/2005 | Mori et al. ..................... | 345/204 |
| 2009/0170564 A1 | 7/2009 | Mori et al. | |

FOREIGN PATENT DOCUMENTS

| | | |
|---|---|---|
| JP | A-2003-304410 | 10/2003 |
| JP | A 2004-127924 | 4/2004 |
| JP | A 2004-291731 | 10/2004 |
| WO | WO 03/075255 A1 | 9/2003 |

* cited by examiner

*Primary Examiner* — Alexander Eisen
*Assistant Examiner* — Matthew Yeung
(74) *Attorney, Agent, or Firm* — Oliff & Berridge, PLC

(57) ABSTRACT

A display method is performed by a display panel having a display area where a plurality of pixels are arranged in a matrix so as to correspond to intersections of a plurality of scanning lines and a plurality of data lines. The display method includes: driving light emitting elements of the pixels on the basis of image data; switching a plurality of different images to display the images on the display area such that portions of the images overlap each other; and putting a black display portion in a portion of the image after the switching which overlaps the image before the switching.

6 Claims, 7 Drawing Sheets

DISPLAY METHOD AND DISPLAY DEVICE PREVENTING IMAGE BURN-IN BY BLACK DISPLAY INSERTION

BACKGROUND

1. Technical Field

The present invention relates to a display method and a display device for displaying the speed and the number of rotations of an engine of a moving body, such as a vehicle, an airplane, a ship, or an electric train.

2. Related Art

In recent years, organic electroluminescent (hereinafter, referred to as EL) panels using organic EL elements have attracted considerable attention since they have lower power consumption, wider viewing angle, and higher contrast than other devices. There is known an organic EL display device using the organic EL panel (for example, see JP-A-2004-127924).

As a conventional vehicle information display device mounted in an instrument panel of a vehicle, such as an automobile, there is known a liquid crystal display device (a multi-display device) for displaying a plurality of images on a screen (for example, see JP-A-2004-291731). Such a vehicle information display device performs three types of display operations by using a first display unit, serving as a speedometer for indicating the speed of the vehicle, a second display unit, serving as a tachometer for indicating the number of rotations of an engine, and a third display unit for displaying, for example, map information of a car navigation apparatus in a liquid crystal panel.

However, it is considered that the convent-ional organic EL display device disclosed in JP-A-2004-127924 is mounted in an instrument panel of a vehicle, such as an automobile, and a plurality of different images are switchably displayed on the same display panel of the same display device such that portions of the images overlap each other.

For example, it is considered that, as the plurality of different images, the image of a speedometer for indicating the speed of a moving body and the image of a tachometer for indicating the number of rotations of an engine are switchably displayed such that portions of the images overlap each other. In this case, when an image R (for example, the image of the speedometer) having a white image portion is displayed on a portion of a display panel at one time and then an image S (for example, the image of the tachometer) having a white image portion overlapping the white image portion of the image R is displayed thereon, burning occurs in an overlapping portion between the image R and the image S, which makes it difficult to obtain high-quality display.

SUMMARY

An advantage of some aspects of the invention is that it provides a display method and a display device capable of preventing burning and of displaying a high-quality image.

According to an aspect of the invention, there is provided a display method that is performed by a display panel having a display area where a plurality of pixels are arranged in a matrix so as to correspond to intersections of a plurality of scanning lines and a plurality of data lines. The method includes: driving light emitting elements of the pixels on the basis of image data; switching a plurality of different images to display the images on the display area such that portions of the images overlap each other; and putting a black display portion in a portion of the image after the switching which overlaps the image before the switching.

When an image R having a white image portion is displayed on a portion of a display area for a predetermined period of time and then an image S having a white image portion overlapping the white image portion of the image R is displayed thereon, burning occurs in an overlapping portion between the image R and the image S.

However, according to the above-mentioned aspect, the black display portion is put in a portion of the image after the switching which overlaps the image before the switching, which prevents burning from occurring in an overlapping part between a high-brightness image portion (for example, a white image portion) of the image after the switching and a high-brightness image portion of the image before the switching. Therefore, it is possible to prevent the occurrence of burning and to perform high-quality display.

In the display method according to this aspect, preferably, the image before the switching includes a first image portion and a second image portion having higher brightness than that of the first image portion, and the black display portion is put in the image after the switching so as to cover the outline of the second image portion.

The outline of the high-brightness image portion of the image before the switching is a burning line appearing to be burning.

According to this aspect, the black display portion is put in the image after the switching so as to cover the outline of the second image portion out of the first image portion included in the image before the switching and the second image portion having higher brightness than that of the first image portion. That is, the burning line is covered with the black display portion. Therefore, burning does not occur in a portion of the image after the switching which overlaps a high-brightness image portion (the second image portion) of the image before the switching.

In the display method according to this aspect, preferably, the image before the switching includes a first image portion and a second image portion having higher brightness than that of the first image portion, and the black display portion is put in the image after the switching so as to cover the entire second image portion.

According to this aspect, the black display portion is put in the image after the switching so as to cover the entire second image portion out of the first image portion included in the image before the switching and the second image portion having higher brightness than that of the first image portion. Therefore, burning does not occur in a portion of the image after the switching which overlaps a high-brightness image portion (the second image portion) of the image before the switching.

In the display method according to this aspect, it is preferable that the plurality of different images include an image of a speedometer indicating the speed of a moving body and an image of a tachometer indicating the number of rotations of an engine of the moving body.

According to this aspect, when the image of the speedometer and the image of the tachometer are switchably displayed on the same display panel, burning does not occur in a portion of the image after switching which overlaps a high-brightness image portion of the image before switching. It is possible to switch the image of the speedometer and the image of the tachometer without burning. Therefore, in a structure in which two display panels are provided in an instrument panel of a vehicle, such as an automobile, it is possible to switch the image of the speedometer and the image of the tachometer respectively displayed on the two display panels. In this way, it is possible to change the display design of an instrument panel of a moving body, for example, the display design of the instrument panel of a vehicle, such as an automobile, according to driver's or passenger's preference.

In the display method according to this aspect, preferably, the plurality of different images are images of meters of the same kind, and, in the images of the meters, high-brightness image portions differ from each other in color.

According to this aspect, when the images of the same kind of meters, for example, speedometers whose high-brightness portions are different from each other in color are switchably displayed on the same display panel, burning does not occur in a portion of the image after switching that overlaps the high-brightness portion of the image before switching. In this way, the images of the same kind of meters can be switched without burning, which makes it possible to change the display design of an instrument panel of a moving body, for example, the display design of the instrument panel of a vehicle, such as an automobile, according to driver's or passenger's preference.

In the display method according to this aspect, it is preferable that the light emitting elements be electroluminescent elements.

According to this aspect, the deterioration of the electroluminescent elements is prevented, which makes it possible to prolong the life span of the electroluminescent elements and to prevent burning.

According to another aspect of the invention a display device includes a display panel that has a display area where a plurality of pixels are arranged in a matrix so as to correspond to intersections of a plurality of scanning lines and a plurality of data lines. In the display device, light emitting elements of the pixels are driven on the basis of image data, and a plurality of different images are switched to be displayed on the display area such that portions of the images overlap each other. In addition, a black display portion is put in a portion of the image after the switching which overlaps the image before the switching.

According to this aspect, it is possible to provide a display device capable of preventing burning and of performing high-quality display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the accompanying drawings.

First Embodiment

Figure 1:
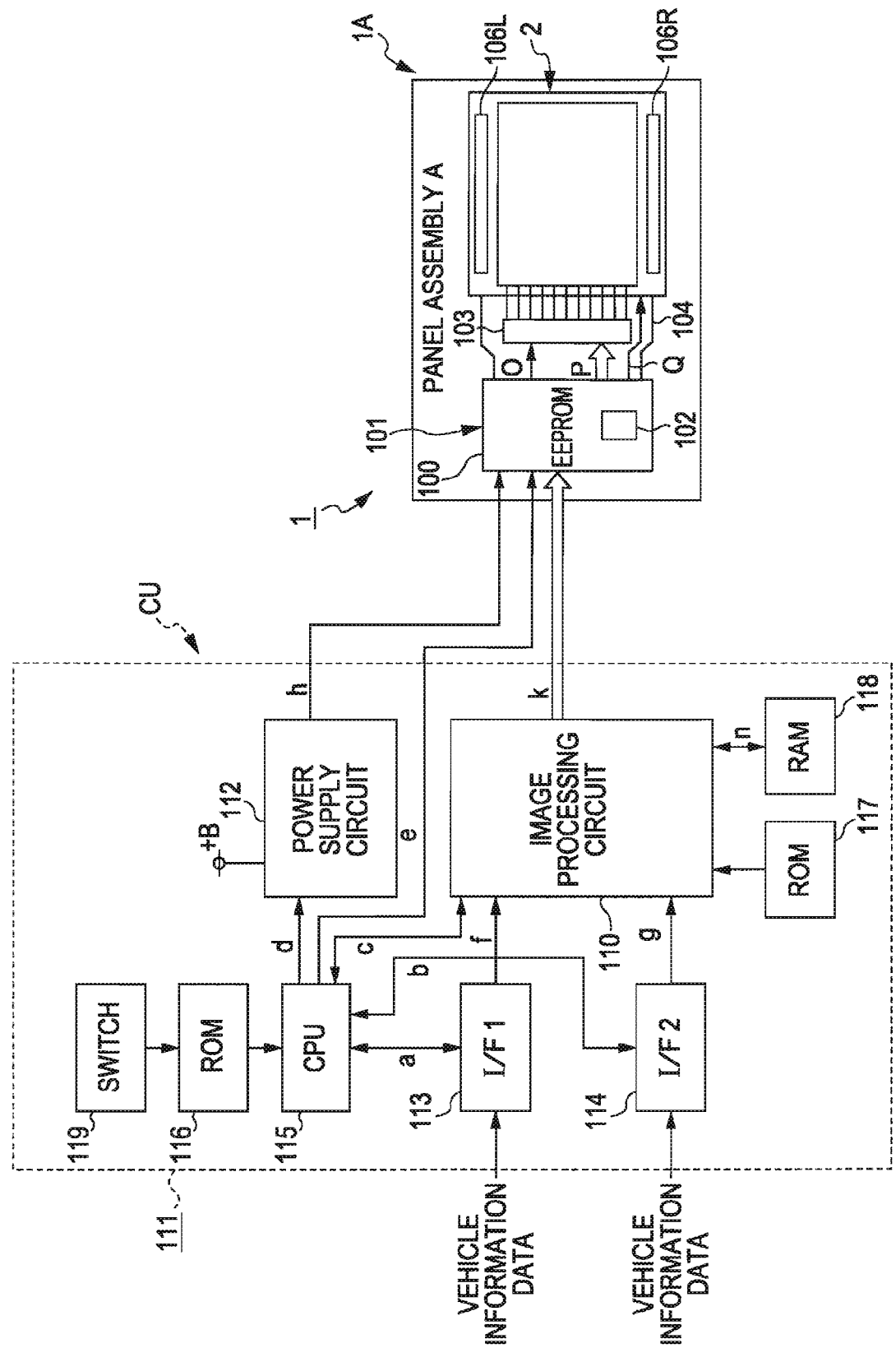
FIG. 1 is a block diagram Illustrating the electrical structure of a display device according to a first embodiment of the invention.
Figure 2:
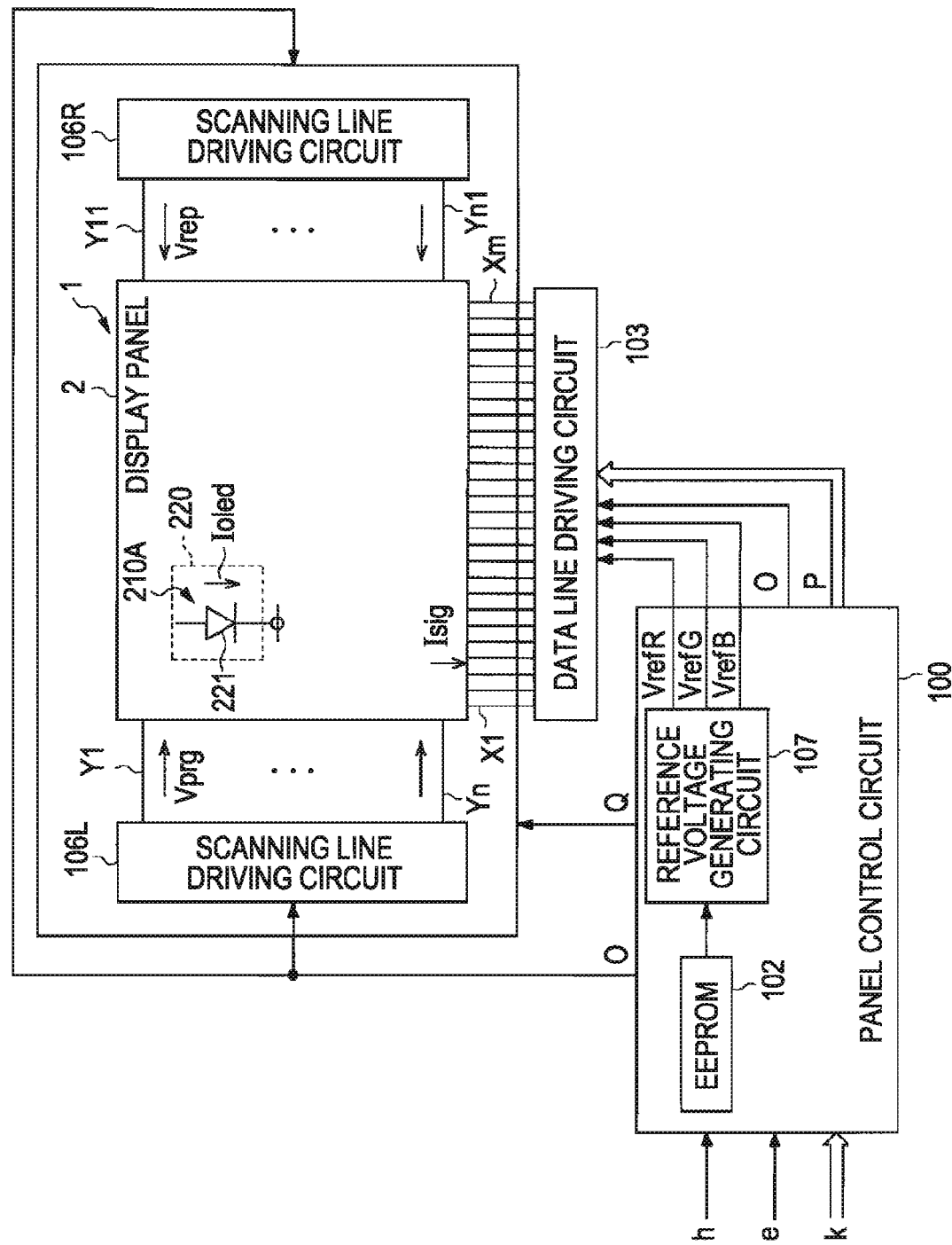
FIG. 2 is a block diagram illustrating the electrical structure of a panel assembly used for the display device.
Figure 3:
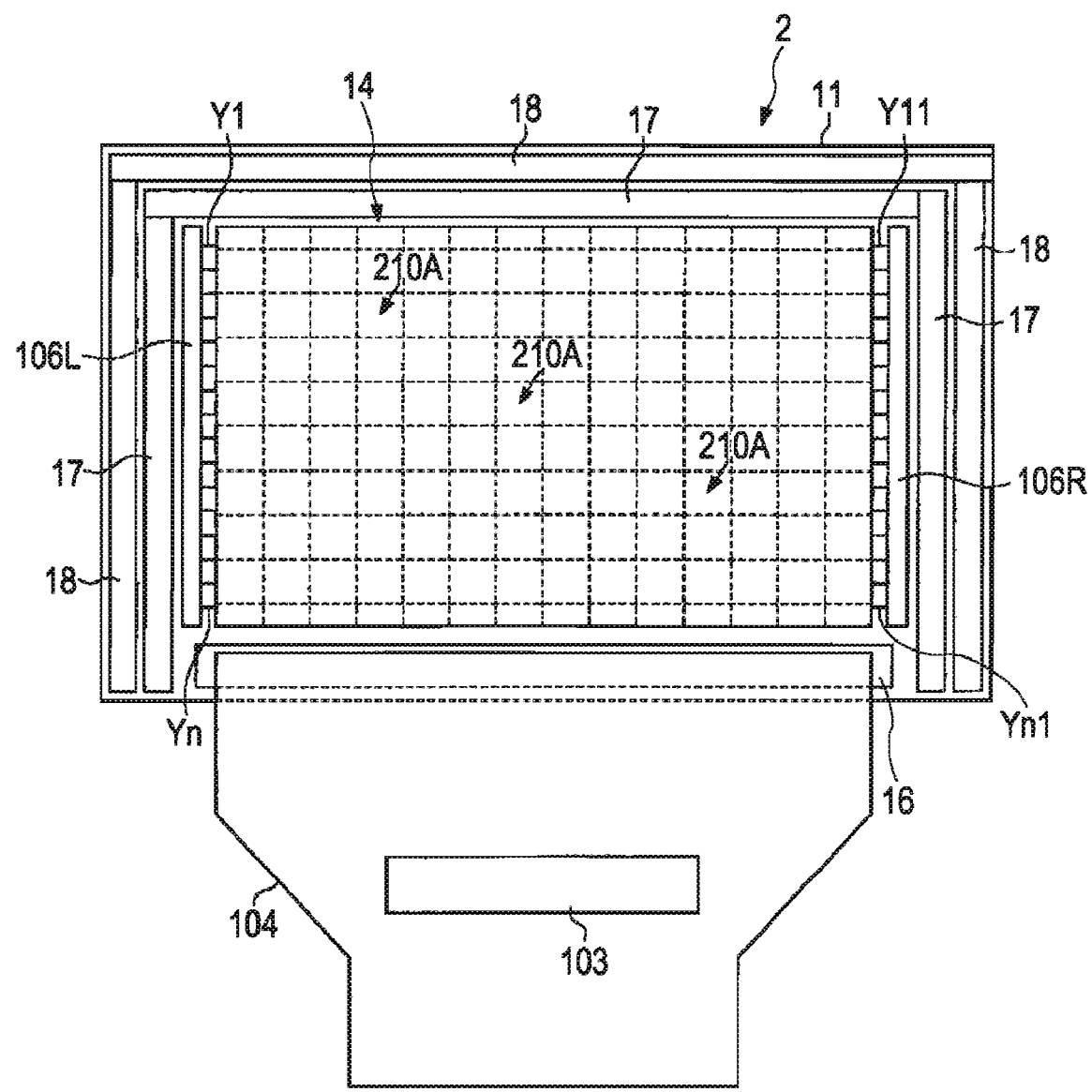
FIG. 3 is a plan view illustrating an organic EL panel of the display device.
Figure 4A:
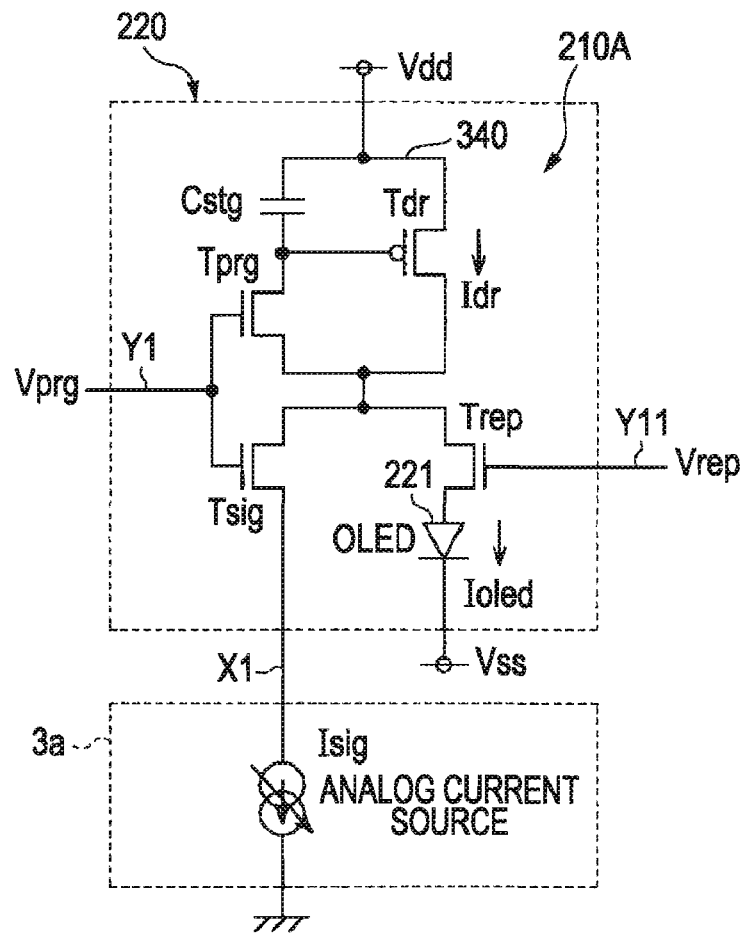
FIG. 4A is a circuit diagram illustrating a pixel circuit.

FIG. 1 is a diagram illustrating the electrical structure of a display device according to a first embodiment of the invention. FIG. 2 is a diagram illustrating the electrical structure of a panel assembly used for the display device. FIG. 3 is a diagram illustrating a display panel of the panel assembly. FIG. 4A is a pixel circuit of the display panel.

First, a display method according to the first embodiment will be described below.

This display method is performed by a display device mounted in an instrument panel of a vehicle, which is an example of a moving body.

This display method is characterized in that: a display panel has a display area where a plurality of pixels are arranged In a matrix so as to correspond to intersections of a plurality of scanning lines and a plurality of data lines; light emitting elements of the pixels are driven on the basis of image data; and a plurality of different images are switched such that some of the images overlap each other in the display area.

Figure 6:
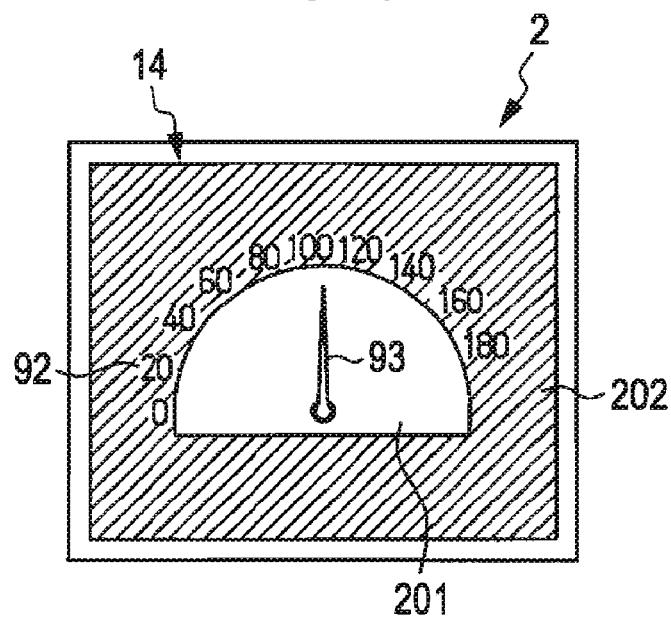
FIG. 6 is a plan view illustrating the image of a speedometer displayed by the display device according to the first embodiment.
Figure 7:
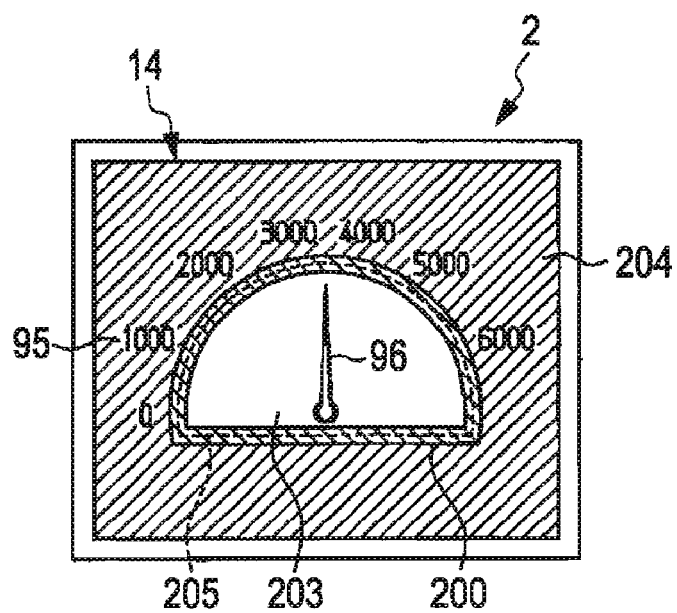
FIG. 7 is a plan view illustrating the image of a tachometer displayed by the display device according to the first embodiment.

This display method is also characterized in that: a plurality of different images include the image of a speedometer indicating the speed of a moving body (see FIG. 6) and the image of a tachometer indicating the number of rotations of an engine of an automobile (the number of rotations of an engine of a moving body) (see FIG. 7).

The image of the speedometer shown in FIG. 6 includes a white image portion 201 positioned in the center thereof (an image portion having high brightness), an indicator 93 in the image portion 201, numbers 92 arranged along the periphery of the white image portion 201 on the outside thereof, and a black image portion 202 which is arranged on the outside of the white image portion 201 and appears to be black. The image portion 202 corresponds to a first image portion described in claim 1, and the image portion 201 having higher brightness than that of the image portion 202 corresponds to a second image portion described in claim 1.

The image of the tachometer shown in FIG. 7 includes a red (orange) image portion 203 positioned in the center thereof, an indicator 96 in the image portion 203, numbers 95 arranged along the periphery of the white image portion 203 on the outside thereof, a black image portion 204 which is arranged on the outside of the red image portion 203 and appears to be black, and a black display portion 200.

Further, the display method is characterized in that the black display portion 200 (see FIG. 7) is provided in a portion of the image after switching (the image of the tachometer) which overlaps the image before switching (the image of the speedometer).

In this embodiment, the image of the speedometer (see FIG. 6) having the white image portion 201 therein is displayed in a portion of the display area 14 for a certain period of time, and the image of the tachometer having the white display portion 203 overlapping the white display portion 201 of the image of the tachometer is displayed. Then, burning occurs in a portion of the tachometer overlapping the white image portion 201 of the image of the speedometer. In order to prevent the burning, as shown in FIG. 7, the black display portion 200 is provided in the portion of the tachometer overlapping the white image portion 201.

The display method according to this embodiment is characterized in that the black display portion is provided so as to cover the outline of a high-brightness image portion (for example, a white image portion) included in the image before switching.

Next, a display device 1 for performing the display method according to the first embodiment will be described below with reference to the drawings. As shown in FIGS. 1 and 2, the display device 1 is an organic EL (electroluminescent) display that includes a panel assembly A having an organic EL panel 2 as a display panel and an image control unit CU. The image control unit CU creates speedometer display image data and tachometer display image data, on the basis of vehicle information data, that is, signals indicating the speed of a vehicle and the number of rotations of an engine thereof, and outputs these image data. In addition, on the basis of image data transmitted from a back monitor (not shown) that is provided at the rear end of the vehicle, the image control unit CU creates image data for displaying a natural image captured by the back monitor, and outputs them. The image data for displaying the natural image is used for an organic EL panel (not shown) other than the organic EL panel 2 to display the natural image.

In the display device 1, the panel assembly A is electrically connected to an output port of the image control unit CU. The display unit 1 displays the image of the speedometer or the image of the tachometer on the organic EL panel 2, on the basis of the speedometer display image data and the tachometer display image data output from the output port.

As show in FIGS. 1 and 2, the panel assembly A includes a panel control substrate 101 having a panel control circuit 100 for displaying an image on the organic EL panel 2 on the basis of two kinds of image data, that is, the speedometer display image data and the tachometer display image data provided therein. In this embodiment, for example, an image processing circuit for processing vehicle information data and a power supply circuit are provided in the image control unit CU. Therefore, the panel control circuit 100 displays one of the image of the speedometer and the image of the tachometer on the organic EL panel 2, on the basis of the image data for display transmitted from the image control unit CU.

The panel control circuit 100 includes an EEPROM 102, serving as a storage unit for storing brightness setting data for setting the brightness of the organic EL panel 2. In addition, the panel control circuit 100 has a plurality of output terminals for outputting a control signal O, driving data P, and panel driving power Q, which are signals used for displaying one of the image of the speedometer and the image of the tachometer on the organic EL panel 2 on the basis of the two kinds of image data for display output from the image control unit CU. The plurality of output terminals (not shown) are electrically connected to a plurality of data lines, a plurality of power lines, and a plurality of control signal lines of the organic EL panel 2 through a plurality of wiring lines that are formed on a flexible substrate 104 having a driving IC 103 for driving the organic EL panel 2 mounted thereon.

The driving IC 103 is composed of a data line driving circuit for driving a plurality of data lines, which will be described later, of the organic EL panel 2. The control signal O is a signal used for controlling scanning line driving circuits, which will be described later, and the driving IC (the data line driving circuit). In addition, the driving a data P is pixel data of pixels (including three types of light emitting elements, that is, a red light emitting element, a green light emitting element, and a blue light emitting element), for example, 8-bit digital gray-scale data, which will be described later.

The flexible wiring substrate 104 is composed of, for example, a flexible printed circuit board (FPC). The flexible wiring substrate 104 has a plurality of input wiring lines (not shown) for connecting a plurality of output terminals of the panel control circuit 100 to a plurality of input terminals of the driving IC 103 and a plurality of output terminals for connecting a plurality of output terminals of the driving IC 103 to the plurality of data lines and scanning lines of the organic EL panel 2 formed thereon. In addition, the flexible wiring substrates 104 has power supply lines for supplying the panel driving power Q to the plurality of power lines of the organic EL panel 2 formed thereon.

The organic EL panel 2 is of a current driven type (a current program type). The organic EL display device includes the organic EL panel 2, two scanning line driving circuits 106L and 106R formed on the left and right sides of the organic EL panel 2, the driving IC 103, serving as a data line driving circuit, and the panel control circuit 100.

As shown in FIGS. 2 and 3, the organic EL panel 2 includes a light emitting element substrate 11 on which a plurality of pixels 210A each having an organic EL element 221, which is an electroluminescent element, as a self-emitting element are arranged in a matrix and a sealing substrate (not shown) which is bonded to the light emitting element substrate 11 so as to seal the plurality of pixels 210A. In the organic EL panel 2, the organic EL elements 221 of the pixels 210A are driven on the basis of image data of the pixels 210A. In FIG. 1, reference numeral 14 indicates a display area where the plurality of pixels 210A are arranged in a matrix, and the outside of the display area 14 is a so-called frame (a non-display area).

Although not shown in FIG. 3, rectangular pixel electrodes, serving as anodes, are formed in a matrix on the light emitting element substrate 11, and a hole injecting/transferring layer and a light emitting layer are sequentially formed on each of the pixel electrodes. In addition, a cathode is formed on almost the entire surface of the substrate having the light emitting layer formed thereon. Thin film transistors (TFTs) are electrically connected to the pixel electrodes, and the pixel electrode and the hole injecting/transferring layer, the light emitting layer, and the cathode formed on the pixel electrode form the organic EL element 221 of each of the pixels 210A. FIG. 2 shows only one of the plurality of pixels 210A.

As shown in FIGS. 2 and 3, in the organic EL panel 2, a plurality of pixel electrodes 210A are arranged on the light emitting element substrate 11 in a matrix of n rows by m columns corresponding to intersections of first n scanning lines Y1 to Yn (n is an integer) extending in a row direction and m data lines X1 to Xm (m is an integer) extending in a column direction. In addition, the organic EL panel 2 has second n scanning lines Y11 to Yn1 extending in a row direction. Each of the plurality of pixels 210A is composed of, for example, three types of organic EL elements 221, that is, a red organic EL element, a green organic EL element, and a blue organic EL element extending in the column direction in this order. That is, each of the plurality of pixels 210A is composed of, for example, three types of pixels, i.e., a red pixel, a green pixel, and a blue pixel.

As shown in FIGS. 3 and 7, the light emitting element substrate 11 has a plurality of pixel power supply lines (m pixel power supply lines) 50 for supplying power to the pixel circuits 220 of the pixels 210A formed thereon. In this embodiment, n pixels 210A arranged in the column direction are connected to one pixel power supply line 50 extending in the vertical direction. In addition, n red pixels, n green pixels, and n blue pixels arranged in the column direction in the order of R, G, and B are independently connected to the pixel power supply lines 50. That is, a red pixel electrode line 50 connected to n red pixels, a green pixel electrode line 50 connected to n green pixels, and a blue pixel electrode line 50 connected to n blue pixels are formed in the column direction in the order of R, G, and B.

In FIG. 3, reference numeral 16 indicates a connection terminal portion where terminals of the plurality of pixel power supply lines 50 are connected to terminals of the plurality of data lines X1 to Xm. The connection terminal portion 16 is electrically connected to a connection terminal portion of the flexible wiring substrate 104. In addition, in FIG. 3, reference numeral 17 indicates a panel power supply line connected to a plurality of red pixel electrode lines 50, a plurality of green pixel electrode lines 50, and a plurality of blue pixel electrode lines 50. The panel power supply circuit 17 is formed on the outer frame (the non-display area) of the display area 14 of the light emitting element substrate 11. In addition, reference numeral 18 indicates a panel ground line connected to the cathodes of the pixels 210A.

Figure 4B:
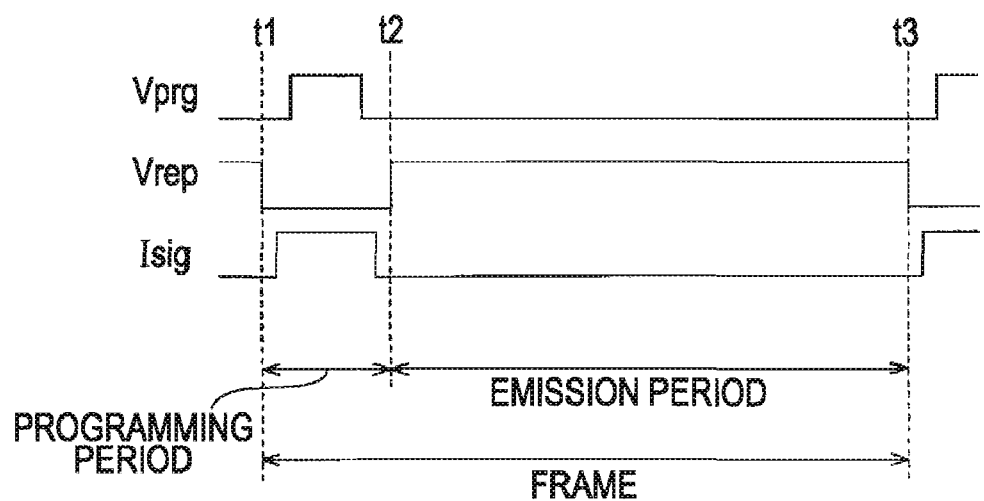
FIG. 4B is a timing chart illustrating the operation of the pixel circuit.

The scanning line driving circuit 106L sequentially generates and outputs H-level programming period selecting signals Vprg (see FIGS. 4A and 4B) at the timing corresponding to a clock signal and a synchronizing signal input as the control signal O, and selects the signals one by one by line-sequentially scanning the first scanning a lines Y1 to Yn. FIG. 4B shows only one programming period (from a point of time t1 to a point of time t2) where a programming period selecting signal Vprg is output to the first scanning line Y1 in the first row among the first scanning lines Y1 to Yn.

The scanning line driving circuit 106R sequentially generates and outputs H-level emission period selecting signals Vrep (see FIG. 4B) at the timing corresponding to a clock signal and a synchronizing signal input as the control signal O, and selects the signals one by one by line-sequentially scanning the second scanning lines Y11 to Yn1. FIG. 4B shows only one emission period (from a point of time t2 to a point of time t3) where an H-level emission period selecting signal Vrep is output to the second scanning line Y11 in the first row among the second scanning lines Y11 to Yn1.

The driving IC 103 collectively supplies programming signal currents Isig (see FIG. 4B) to the pixel circuits 220 connected to the first selected scanning line through the data lines X1 to Xm in the programming period.

The programming signal currents Isig are current signals obtained by converting image data of green and blue pixels, which is n-bit digital grayscale data for grayscale display, into analog signals. In this embodiment, the image data of each pixel 210A is digital grayscale data which represents the brightness of each pixel in an 8-bit binary number, and has 256 grayscale values from 0 to 255.

As shown in FIG. 4, the driving IC 103 includes, for example, a data writing circuit (a sampling circuit) for writing the programming signal currents Isig onto the pixel circuits 220 through the data lines X1 to Xm, a latch circuit, a shift register for controlling the operating timing of the data writing circuit, and a digital-to-analog converter. The latch circuit stores the image data of the pixels in memories each provided in the pixel and holds image data corresponding to one line.

The image data stored in the memories are collectively read out and are then output to the digital-to-analog converter (not shown) of the driving IC 103.

In the organic EL panel 2, three types of organic EL elements 221 (a red organic EL element, a green organic EL element, and a blue organic EL element) form one pixel 210A, and the pixels are arranged in a matrix so as to correspond to intersections of a plurality of scanning lines and a plurality of data lines.

The plurality of pixels 210A have three types of pixel circuits, that is, red, green, and blue pixel circuits respectively having a red organic EL element, a green organic EL element, and a blue organic EL element which emit red, green, and blue light components from their light emitting layers each made of an organic semiconductor material (see FIG. 4A). The three types of pixel circuits 220 forming one pixel 210A have the same circuit structure except that the colors of light components emitted from the organic EL elements 221 differ from each other.

Next, the structure of the pixel circuit 220 will be described below with reference to FIG. 4A.

Each of the pixel circuits 220 includes a driving transistor Tdr, a transistor Tprg for programming, a transistor Tsig selected in programming, a transistor Trep selected in emission, and a storage capacitor Cstg. The driving transistor Tdr is formed of a P-charnel TFT. The transistor Tprg for programming, the transistor Tsig selected in programming, and the transistor Trep selected in emission are formed of N-channel TFTS.

A drain of the driving transistor Tdr is connected to an anode of the organic EL element 221 through the transistor Trep selected in emission. The cathode of the organic EL element 221 is connected to the ground. Also, the drain of the driving transistor Tdr is connected to one data line (the data line X1 in FIG. 4A) through the transistor Tsig selected in programming. In addition, the source of the driving transistor Tdr is connected to a high voltage supply Vdd. The gate of the driving transistor Tdr is connected to a first electrode of the storage capacitor Cstg. A second electrode of the storage capacitor Cstg is connected to the high voltage supply Vdd. The transistor Tprg for programming is connected between the gate and the drain of the driving transistor Tdr.

The gates of the transistor Tsig selected in programming and the transistor Tprg for programming are connected to one of the first scanning lines (the first scanning line Y1 in FIG. 4A). The transistor Tsig selected in programming and the transistor Tprg for programming are turned on in response to an H-level programming period selecting signal Vprg transmitted from the first scanning line Y1, and are turned off in response to an L-level programming period selecting signal Vprg. In this embodiment, when the transistor Tsig selected in programming and the transistor Tprg for programming are turned on, the programming signal current Isig is supplied to the data line X1.

The gate of the transistor Trep selected in emission is connected to one of the second scanning lines (the second scanning line Y11 in FIG. 4A). The transistor Trep selected in emission is turned on in response to an H-level emission period selecting signal Vrep transmitted from the second scanning line Y11, and is turned off in response to an L-level emission period selecting signal Vrep. In this embodiment, when the transistor Trep selected in emission is turned on, a driving transistor supply current Idr is supplied to the organic EL element 221 as an OLED supply current Ioled, on the basis of the on state of the driving transistor Tdr.

Next, the operation of each pixel 220 will be briefly described with reference to FIG. 4B.

1. Programming Period

When an H-level programming period selecting signal Vprg is supplied from the first scanning line Y1, the transistor Tprg for programming and the transistor Tsig selected in programming are turned on. At that time, an L-level emission period selecting signal Vrep is supplied from the second scanning line Y11, and the transistor Trep selected in emission is turned off. As a result, a programming signal current Isig is supplied to the data line X1. Since the transistor Tprg for programming is turned on, the driving transistor Tdr is connected in a diode manner. Accordingly, the programming signal current Isig flows through the driving transistor Tdr, the transistor Tsig selected in programming, and the data line X1 in this order. At that time, an electronic charge corresponding to the potential of the gate of the driving transistor Tdr is stored in the storage capacitor Cstg.

2. Emission Period

In this state, when the programming period selecting signal Vprg turns to an L level and the emission period selecting signal Vrep turns to an H level, the transistor Tprg for programming and the transistor Tsig selected in programming are turned off, and the transistor Trep selected in emission is turned on. At that time, since the electronic charge stored in the storage capacitor Cstg does not vary, the potential of the gate of the driving transistor Tdr is maintained at a voltage when the programming signal current Isig flows. Thus, a driving transistor supply current Idr (OLED supply current Ioled) corresponding to the voltage of the gate flows between the source and the drain of the driving transistor Tdr. More specifically, the OLED supply current Ioled flows in the order of the driving transistor Tdr, the transistor Trep selected in emission, and the organic EL element 221. Accordingly, the organic EL element 221 emits light at a brightness corresponding to the OLED supply current Ioled (programming signal current Isig).

Such an operation is sequentially performed in the pixel circuits 220 connected to the first scanning lines Y2 to Yn, so that display corresponding to one frame is performed.

The panel control circuit 100 of the panel assembly A includes the EEPROM 102 and a reference voltage generating circuit 107. The EEPROM 102 has brightness correction data for correcting the brightness of the organic EL panel 2 stored therein. In addition, the EEPROM 102 also has parameters for initializing the driving IC 103, for example, data for setting the frame frequency of the organic EL panel 2 stored therein.

In this embodiment, the brightness of the organic EL panel 2 can be controlled by correcting the reference voltage of the digital-to-analog converter of the driving IC 103 for each color R, G, or B, on the basis of the brightness correction data stored in the EEPROM 102 (see FIG. 2) Therefore, the reference voltage generating circuit 107 corrects the reference voltage of the digital-to-analog converter when power is turned on, on the basis of the brightness correction data, to generate reference voltages VrefR, VrefG, and VrefB for the colors R, G, and B, and outputs the generated reference voltages to the driving IC 103.

Figure 5:
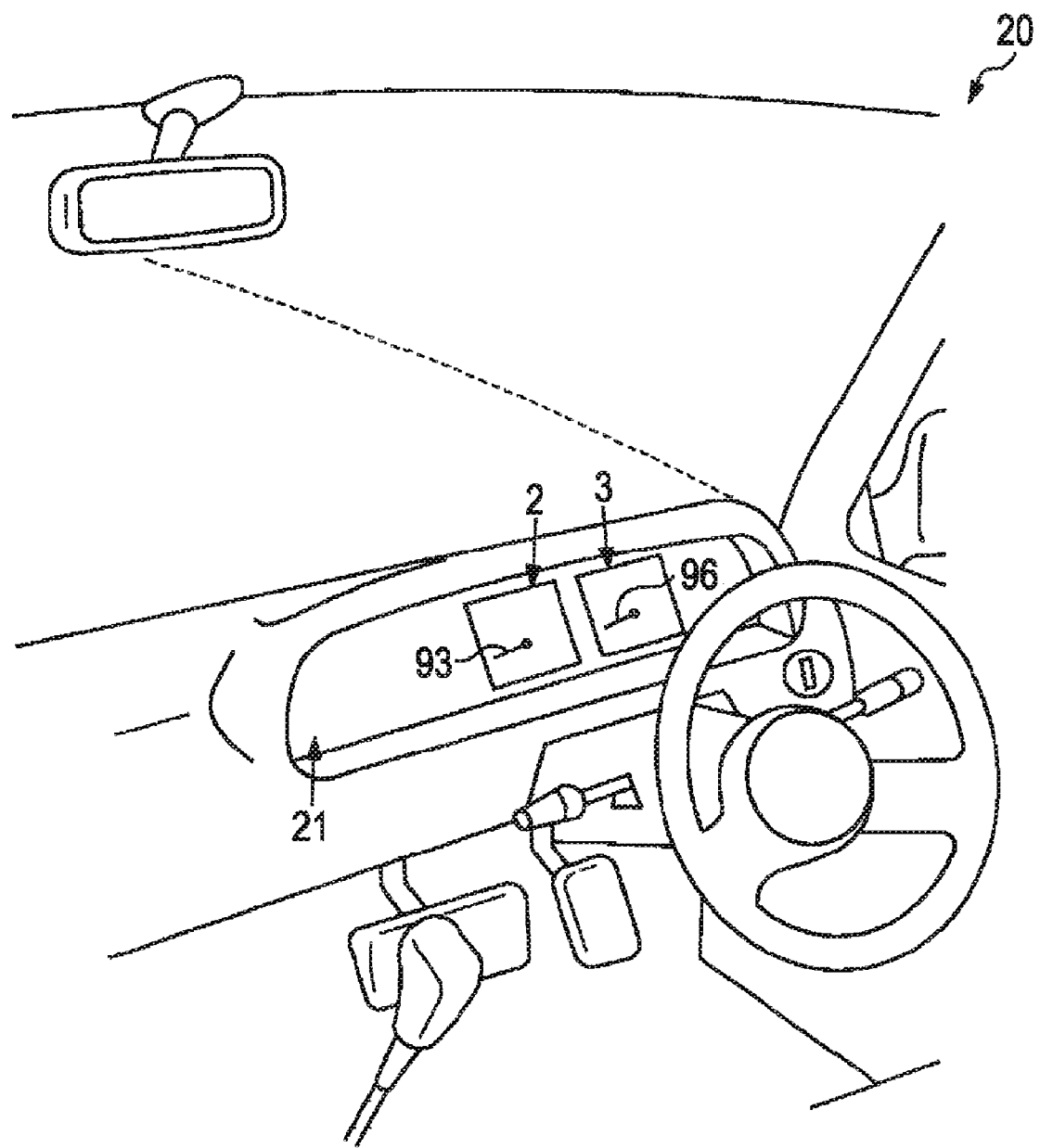
FIG. 5 is a perspective view illustrating an instrument panel of a vehicle having the display device mounted therein.

As shown in FIG. 5, the display device 1 is provided with an instrument panel 21 of a vehicle, such as an automobile. The display device 1 displays one of the image of the speedometer shown in FIG. 6 and the image of the tachometer shown in FIG. 7.

Electrical Structure of Image Control Unit

Next, the electrical structure of the image control unit CU will be described below in detail with reference to FIG. 1.

The image control unit CU includes an image control substrate 111 having an image processing circuit 110 provided thereon. The image processing circuit 110 creates speedometer display image data for displaying the numbers 92 and the indicator 93 of the speedometer and tachometer display image data for displaying the numbers 95 and the indicator 96 of the tachometer, on the basis of vehicle information data, and outputs these image data to the panel control circuit 100 of the panel assembly A.

Further, the image control unit CU includes a power supply circuit 112 for supplying power to the organic EL panel 2 through a plurality of output ports and a plurality of input circuits (interfaces I/F1 and I/F2) 113 and 114 to which the vehicle information data and the image data are input, respectively. In addition, the image control unit CU further includes a CPU 115 for controlling the image processing circuit 110, the power supply circuit 112, and the input circuits 113 and 114, a ROM 116 for storing various control programs, a ROM 117 for storing various image data used for processing images, and a RAM 118 for processing images.

The ROM 117 has background data for displaying the numbers 92 of the speedometer and background data for displaying the numbers 9D of the speedometer stored therein. In addition, the ROM 117 has image data for creating the image of the indicator 93 that is displayed to be overlapped with the numbers 92 of the speedometer and image data for creating the image of the indicator 96 that is displayed to be overlapped with the numbers 95 of the speedometer stored therein. As shown in FIG. 7, the ROM 117 further has image data used for putting the black display portion 200 in a portion of the image of the tachometer overlapping the white image portion 201 (see FIG. 6) stored therein.

For example, the following two methods may be used to overlap the indicator 93 with the background data for displaying the numbers 92. These two methods may be also used to overlap the indicator 96 with the background data for displaying the numbers 95.

First, a plurality of indicator data (indicator data for the indicator 93) indicating the positions of the indicator which deviate from each other by predetermined angular intervals are stored in the ROM 117, and indicator data corresponding to the speed of a vehicle is read out. Then, the read indicator data is added to the background data to create speedometer display image data.

Second, the image data of the indicator 93 placed at an angular position corresponding to vehicle speed data is created, and the created image data of the indicator is added to the background data to create the two types of meter display image data.

The vehicle speed data and engine speed data used for creating the speedometer display image data and the tachometer display image data are input to the input circuit 113. The vehicle speed data and the engine speed data respectively detected by a vehicle speed sensor and an engine speed sensor are sequentially transmitted over a vehicle network together with a shift lever position detecting signal detected by a shift sensor. As a vehicle network protocol, for example, CAN (controller area network) or Flex Ray can be used. The image data transmitted from the camera of the back monitor is input to the input circuit 114.

In the image control unit CU shown in FIG. 1, characters 'a', 'b', 'c', 'd', 'e', 'f', and 'g' indicate a vehicle information data control signal, an image data control signal, an image processing circuit control signal, a power supply circuit control signal, a panel assembly control signal, vehicle information data, and image data, respectively. In addition, characters 'h', 'k', and 'n' denote a power supply signal to be input to the panel assembly A, image data to be input to the panel assembly A, and a control signal for the RAM 18, respectively.

The CPU 115 transmits the vehicle information data f (the vehicle speed data and the engine speed data) input to the input circuit 113 to the image processing circuit 110 on the basis of the vehicle information data control signal a. In addition, the CPU 115 transmits the image data input to the input circuit 114 to the image processing circuit 110 on the basis of the image data control signal g. Further, the CPU 115 outputs the image data k from the image processing circuit 110 to the panel assembly A on the basis of the image processing circuit control signal c. Furthermore, the CPU 115 outputs the panel assembly control signal e to the panel assembly A. The image data k includes, for example, the speedometer display image data and the tachometer display image data.

The image control unit CU is provided with a switch 119 for a driver or passenger to manually switch the speedometer image shown in FIG. 6 and the tachometer image shown in FIG. 7.

In the display device 1 having the above-mentioned structure, the speedometer image shown in FIG. 6 is displayed on the display area 14 of the organic EL panel 2 for a predetermined period of time. When, the driver or passenger manually operates the switch 119 shown in FIG. 1 to display the tachometer image shown in FIG. 7 on the display area 14 of the organic EL panel 2. In this case, when a portion of the tachometer image overlaps the white image portion 201 of the speedometer image, burning occurs in the overlapping portion. Therefore, in this embodiment, in order to prevent the burning, the black display portion 200 (see FIG. 7) is put in a portion of the tachometer image overlapping the white image portion 201. The black display portion 200 is provided so as to cover the outline of the white image portion 201 included in the Image before switching (the speedometer image).

According to the first embodiment configured in this way, the following effects are obtained.

When switching between the speedometer image and the tachometer image is performed to display an image such that the images partially overlap each other on the display area 14, the black display portion 200 (see FIG. 7) is put in a portion of the tachometer image (the image after switching) overlapping the speedometer image (the image before switching). In this way, burning does not occur in a portion of the tachometer image overlapping a high-brightness portion of the speedometer image, which makes it possible to perform high-quality display.

The black display portion 200 is provided so as to cover the outline of the white image portion 201 included in the speedometer image. That is, the outline (the outline represented by a dashed line in FIG. 7) of the white image portion 201 included in the speedometer image appears to be a burning line 205, and the entire burning line 205 is covered with the ring-shaped black display portion 200. Therefore, the burning does not occur in a portion of the tachometer image shown in FIG. 7 that overlaps with the speedometer image, which makes it possible to perform high-quality display.

It is possible to switchably display the speedometer image and the tachometer image on the same organic EL panel 2. In this way, it is possible to change the display design of an instrument panel of a moving body, for example, the display design of the instrument panel 21 of a vehicle, such as an automobile, according to driver's or passenger's preference.

The driver or passenger can manually operate the switch 119 to select one of the speedometer image and the tachometer image. In this way, as shown in FIG. 5, in a structure in which two organic EL panels 2 and 3 are provided in the instrument panel 21, it is possible to switch the speedometer image and the tachometer image respectively displayed on the organic EL panels 2 and 3. For example, as shown in FIG. 5, when the speedometer image is displayed on the organic EL panel 2 and the tachometer image is displayed on the organic EL panel 3, the driver or passenger can manually operate the switch 119 to display the speedometer image on the organic EL panel 3 and the tachometer image on the organic EL panel 2. In this way, it is possible to change the display design of the instrument panel 21 according to driver's or passenger's preference.

Second Embodiment

Next, a display method according to a second embodiment of the invention will be described below.

The display method according to the second embodiment is performed by a display device having the same structure as that of the display device 1 according to the first embodiment.

Figure 8:
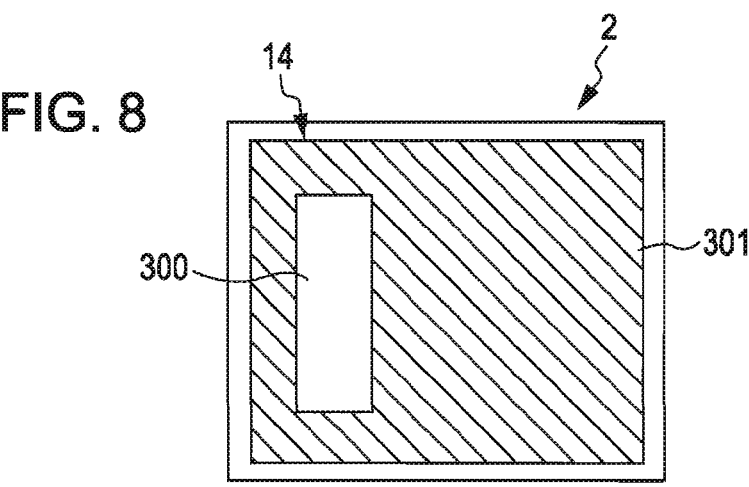
FIG. 8 is a diagram illustrating an image displayed by a display device according to a second embodiment of the invention.
Figure 9:
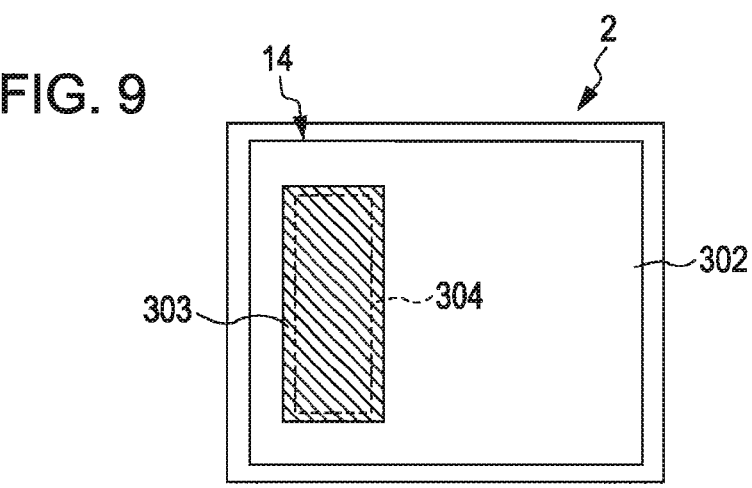
FIG. 9 is a diagram illustrating another image displayed by the display device according to the second embodiment.

The display method according to the second embodiment is used to prevent burning when an image including a white image portion 300 is displayed on a portion of the display area 14 of the organic EL panel 2 at one time or for a predetermined period of time, as shown in FIG. 8, and then an image including a white image portion 302 is displayed on the entire display area 14 as shown in FIG. 9. The image shown in FIG. 8 includes the white image portion 300 and a black image portion 301 which is disposed on the outside of the white image portion 300. The image portion 301 corresponds to a first image portion described in Claims, and the image portion 300 having higher brightness than that of the image portion 301 corresponds to a second image portion described in Claims.

In the image shown in FIG. 9, a black display portion 303 is put in the white image portion 302 so as to cover the entire white image portion 300 of the image shown in FIG. 8. In addition, in FIG. 9, reference numeral 304 denotes a burning line appearing when the outline (the outline represented by a dashed line in FIG. 9) of the white image portion 300 included in the image shown in FIG. 8 is burned.

According to the second embodiment configured in this way, the following effects are obtained.

In the image shown in FIG. 9, the black display portion 303 is put in the white image portion 302 so as to cover the entire white image portion 300 of the image (the image before switching) shown in FIG. 8. In this way, burning does not occur in a portion of the image (the image after switching) shown in FIG. 9 overlapping the white image portion 300 of the image shown in FIG. 8, which makes it possible to perform high-quality display.

Third Embodiment

Next, a display method according to a third embodiment of the invention will be described below.

Figure 10:
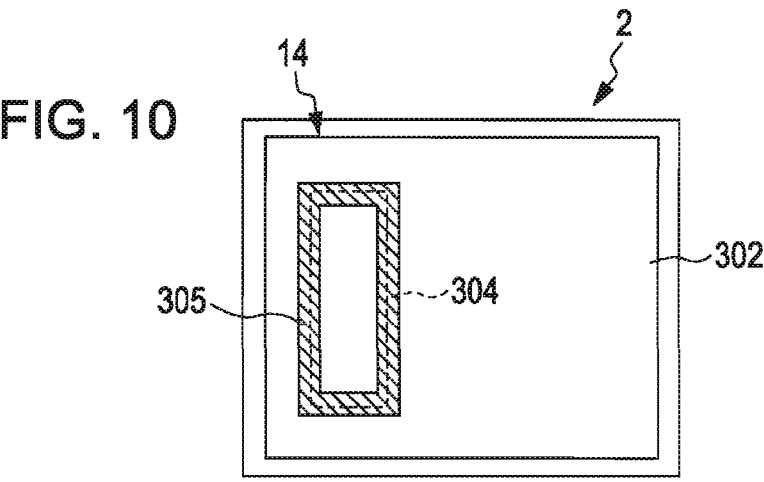
FIG. 10 is a diagram illustrating an image displayed by a display device according to a third embodiment of the invention.

Similar to the display method according to the second embodiment, the display method according to the third embodiment is used to prevent burning when an image including a white image portion 300 is displayed on a portion of the display area 14 of the organic EL panel 2 at one time or for a predetermined period of time, as shown in FIG. 8, and then an image including a white image portion 302 is displayed on the entire display area 14 as shown in FIG. 10. In the image shown in FIG. 10, a ring-shaped black display portion 305 is put in the white image portion 302 so as to cover the outline of the white image portion 300 of the image shown in FIG. 8. In addition, in FIG. 10, reference numeral 305 denotes a burning line appearing when the outline (the outline represented by a dashed line in FIG. 10) of the white image portion 300 included in the image shown in FIG. 8 is burned.

According to the third embodiment configured in this way, the following effects are obtained.

In the image shown in FIG. 10, the ring-shaped black display portion 305 is put in the white image portion 302 so as to cover the outline of the white image portion 300 of the image shown in FIG. 8. That is, the ring-shaped black display portion 305 covers the entire burning line 304 appearing when the white image portion 300 of the image shown in FIG. 8 is burned. Therefore, burning does not occur in a portion of the image shown in FIG. 10 which overlaps the white image portion 300 of the image shown in FIG. 8, which makes it possible to perform high-quality display.

In the above-described embodiments, it is possible to switch the speedometer image and the tachometer image displayed on the same organic EL panel 2. In this way, it is possible to change the display design of an instrument panel of a moving body, for example, the display design of the instrument panel of a vehicle, such as an automobile, according to driver's or passenger's preference.

Further, the following modifications of the invention can be made.

In the above-described embodiments, the driver or passenger manually operates the switch 119 to selectively display one of the speedometer image and the tachometer image on the same organic EL panel 2. However, meters of the same kind may be switchably displayed on the same organic EL panel 2 in different display designs by a manual operation. For example, the following structure may be used: as the tachometer image shown in FIG. 7, two kinds of images, that is, an image having a red (or orange) image portion 203 in the center thereof and an image having a green image portion in the center thereof, are prepared; and the driver or passenger manually operates the switch 119 to selectively display one of the two kinds of images on the same organic EL panel 2. According to this structure, it is possible to change the display design of an instrument panel of a moving body, for example, the display design of the instrument panel 21 of a vehicle, such as an automobile, according to driver's or passenger's preference.

Further, in the above-described embodiments, the organic EL elements, serving as light-emitting elements, are used to display, for example, the images of meters on the display area. However, the invention can be applied to a display method and a display device for displaying, for example, the images of meters on the display area by driving light emitting elements other than the organic EL elements.

In the above-described embodiments, the driving IC 103 composed of the data line driving circuit is mounted on the flexible wiring substrate 104. However, the invention can be applied to a structure in which the data line driving circuit is formed on the light emitting element substrate 11 of the organic EL panel 2.

In the above-described embodiments, the organic EL panel using the organic electroluminescent elements as the light emitting elements is used. However, the invention can be applied to a structure in which an inorganic EL panel using inorganic electroluminescent elements (inorganic EL elements) as the light emitting elements is used. The inorganic EL elements are formed by, for example, a vapor deposition method.

In the above-described embodiments, simple images are used for the purpose of the convenience of description. However, the invention can be applied to various images other than the speedometer and the tachometer, such as vehicle driving or maintenance information and information images for informing the approach of an emergency vehicle.

In the pixel structure of the organic EL panel according to the above-described embodiments, the pixels are composed of three-color pixels, that is, R, G, and B pixels. The number of colors is not limited to three. For example, the pixels may be composed of two or four or more color pixels. In addition, the panel (the organic EL panel or the inorganic EL panel) performing color display using three colors R, G, and B may be formed by printing three colors R, G, and B on the pixels, or it may be a panel formed of a white material and R, G, and B color filters.

In the former case, three pixels constituting the plurality of pixels are composed of three types of pixels, that is, red, green, and blue pixels having a red organic EL element, a green organic EL element, and a blue organic EL element respectively emitting red, green, and blue light components from their light emitting layers each made of an organic semiconductor material. In the latter case, the panel includes an organic EL panel in which three pixels constituting the plurality of pixels are composed of white organic EL elements emitting white light from their light emitting layers, each made of an organic semiconductor material, and R, G, and B color filters. In this structure, the organic semiconductor material may be a low molecular material or a high molecular material.

In the above-described embodiments, simple images are used for the purpose of the convenience of description. However, various information items other than information on the speedometer and the tachometer, such as vehicle driving or maintenance information and information indicating the approach of an emergency vehicle, are generally used. The invention can be applied to a structure for displaying information items other than information on the speedometer or the tachometer.

The pixel structure of the organic EL panel according to the above-described embodiments is composed of R, G, and B pixels. The number of colors is not limited to three. For example, the pixels may be composed of two or four or more color pixels. In addition, the panel may be formed by printing three colors R, G, and B on the pixels, or it may be a panel formed of a white material and R, G, and B color filters. In this structure, the organic semiconductor material may be a low molecular material or a high molecular material.

What is claimed is:

1. A display method that is performed by a display panel having a display area where a plurality of pixels are arranged in a matrix so as to correspond to intersections of a plurality of scanning lines extending in a row direction and a plurality of data lines extending in a column direction, the method comprising:

driving light emitting elements of the pixels on the basis of image data;

switching a plurality of different images to display the different images on the display area in succession such that portions of the different images overlap each other; and putting a black display portion in a portion of a next image of the different images after the switching where the next image overlaps a previous image of the different images displayed before the switching, wherein the previous image includes a first image portion and a second image portion having higher brightness than that of the first image portion, the black display portion is put in the next image such that the black display portion covers and includes a portion of the display area located on one side of an outline of the second image portion to another portion of the display area located on the other side of the outline of the second image portion, the black display portion is not included in at least a portion of the image within the outline of the second image portion, and the black display portion is put in the next image such that the black display portion includes consecutive pixels arranged in the column direction.

2. The display method according to claim 1, wherein the black display portion is put in the next image so as to cover the entire second image portion.

3. The display method according to claim 1, wherein the plurality of different images include an image of a speedometer indicating the speed of a moving body and an image of a tachometer indicating the number of rotations of an engine of the moving body.

4. The display method according to claim 1, wherein the plurality of different images are images of the same kind of meters whose high-brightness image portions are different from each other in color.

5. The display method according to claim 1, wherein the light emitting elements are electroluminescent elements.

6. A display device comprising:

a display panel that has a display area where a plurality of pixels are arranged in a matrix so as to correspond to intersections of a plurality of scanning lines extending in a row direction and a plurality of data lines extending in a column direction, wherein light emitting elements of the pixels are driven on the basis of image data, a plurality of different images are switched to be displayed on the display area in succession such that portions of the different images overlap each other, a black display portion is put in a portion of a next image of the different images after the switching where the next image overlaps a previous image of the different images displayed before the switching, the previous image includes a first image portion and a second image portion having higher brightness than that of the first image portion, the black display portion is put in the next image such that the black display portion covers and includes a portion of the display area located on one side of an outline of the second image portion to another portion of the display area located on the other side of the outline of the second image portion, the black display portion is not included in at least a portion of the image within the outline of the second image portion; and the black display portion is put in the next image such that the black display portion includes consecutive pixels arranged in the column direction.

* * * * *